United States Patent
Lu et al.

(10) Patent No.: US 9,049,493 B2
(45) Date of Patent: Jun. 2, 2015

(54) TECHNIQUES ENABLING VIDEO SLICE ALIGNMENT FOR LOW-LATECY VIDEO TRANSMISSIONS OVER MMWAVE COMMUNICATIONS

(75) Inventors: Ning Lu, Saratoga, CA (US); Guoqing Li, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 567 days.

(21) Appl. No.: 12/880,731

(22) Filed: Sep. 13, 2010

(65) Prior Publication Data

US 2012/0063506 A1    Mar. 15, 2012

(51) Int. Cl.
*H04N 7/26*      (2006.01)
*H04N 21/6332*   (2011.01)
*H04N 21/236*    (2011.01)

(52) U.S. Cl.
CPC ..... *H04N 21/6332* (2013.01); *H04N 21/23614* (2013.01)

(58) Field of Classification Search
CPC .............. H04N 21/6332; H04N 21/23614
USPC .................. 375/240; 386/331; 348/42–60
See application file for complete search history.

(56) References Cited

U.S. PATENT DOCUMENTS

| | | | |
|---|---|---|---|
| 7,768,950 B2* | 8/2010 | Kim et al. ............ | 370/310 |
| 8,149,806 B2* | 4/2012 | Kesselman et al. ..... | 370/338 |
| 2009/0010332 A1 | 1/2009 | Jeon et al. | |
| 2011/0069652 A1* | 3/2011 | Kakani et al. ......... | 370/312 |
| 2011/0274180 A1* | 11/2011 | Lee et al. ........... | 375/240.25 |
| 2011/0274414 A1* | 11/2011 | Nemiroff et al. ...... | 386/331 |

FOREIGN PATENT DOCUMENTS

| | | | |
|---|---|---|---|
| JP | 2007-208917 | * | 8/2007 |
| JP | 2007-208917 A | | 8/2007 |
| WO | 2007/081150 A1 | | 7/2007 |
| WO | 2012/036839 A2 | | 3/2012 |
| WO | 2012/036839 A3 | | 5/2012 |

OTHER PUBLICATIONS

International Preliminary Report on Patentability Received for PCT Patent Application No. PCT/US2011/048432, mailed on Mar. 28, 2013, 7 pages.
International Search Report and Written Opinion Received for PCT Application No. PCT/US2011/048432, mailed on Mar. 9, 2012, 10 pages.

* cited by examiner

*Primary Examiner* — William C. Vaughn, Jr.
*Assistant Examiner* — Naod Belai
(74) *Attorney, Agent, or Firm* — Ellis B Ramirez; PRASS LLP

(57) ABSTRACT

An embodiment of the present invention provides an apparatus, comprising, a transceiver adapted for low-latency video transmissions over mmWave communications by using a slice alignment indication field in an audio/video protocol adaptation layer (A/V PAL) packet header to indicate whether a payload is aligned at a slice boundary and thus does not need parsing at a sink.

19 Claims, 2 Drawing Sheets

TECHNIQUES ENABLING VIDEO SLICE ALIGNMENT FOR LOW-LATECY VIDEO TRANSMISSIONS OVER MMWAVE COMMUNICATIONS

BACKGROUND

Wireless displays have been recognized as an important use for next generation wireless technologies, such as 60 GHz radio. 60 GHz wireless displays pose very stringent end to end (E2E) latency requirements due to Gbps data rates: 2-5 ms for gaming and 10-20 ms for other displays.

Specifically, the Wireless Gigabit Alliance (also known as WiGig and is an organization promoting the adoption of multi-gigabit-speed wireless communications) audio/video protocol adaptation layers (A/V PAL) is defining the audio/video transmissions over 60 GHz wireless links for wireless displays. The A/V PAL can transport uncompressed as well as compressed video streams. Generally, compression is based on micro-blocks 140 and the compressed data is organized into slice (slice 1 110, slice 2 120 and slice 3 130) for transport where a slice is composed of several lines of a video frame as shown in FIG. 1, generally as 100.

Due to the size limitation of medium access control (MAC) service data units (SDU), a slice may be fragmented into multiple PAL packets or aggregation may occur across slice boundaries. Consequently, the sink has to implement a parsing function in order to reconstruct a video slice before starting decoding the data.

The parsing at the receiver side introduces extra E2E latency, which leads to a degraded user experience. In addition, parsing requires extra buffer in order to store the received packet and to reconstruct a video slice before the decoding starts.

Consequently, there is a strong need in the wireless communication industry for techniques enabling video slice alignment for low-latency video transmissions over mmWave communications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
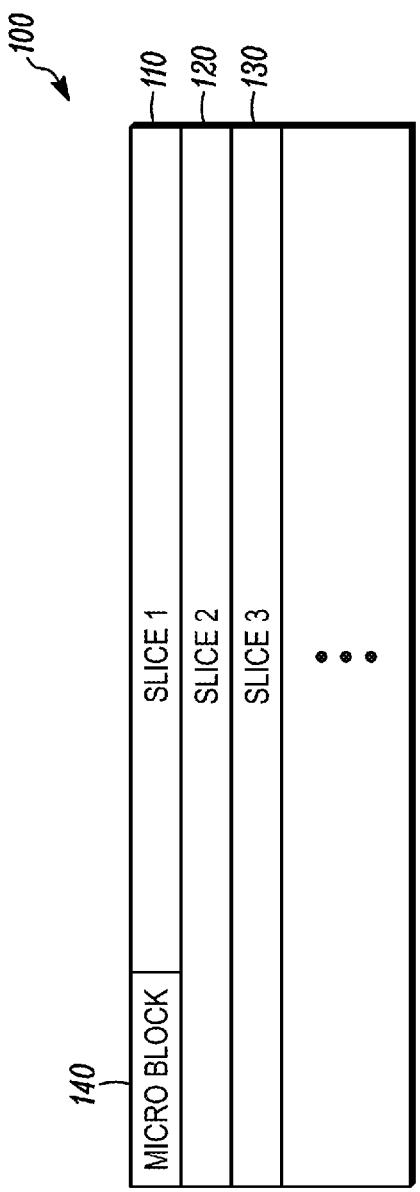
FIG. 1 illustrates video slices within a video frame according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide using a slice alignment field in an A/V PAL packet header to indicate whether the payload is aligned at the slice boundary, and thus does not need parsing at a sink if the field is set.

As mentioned above, WiGig may define 60 GHz radio specifications. A/V PAL (audio/video protocol adaptation layer) is a layer above the medium access control (MAC) layer defining audio/video transmissions over 60 GHz radio. A video slice (110, 120, 130) is composed of several video lines in a video frame.

Figure 2:
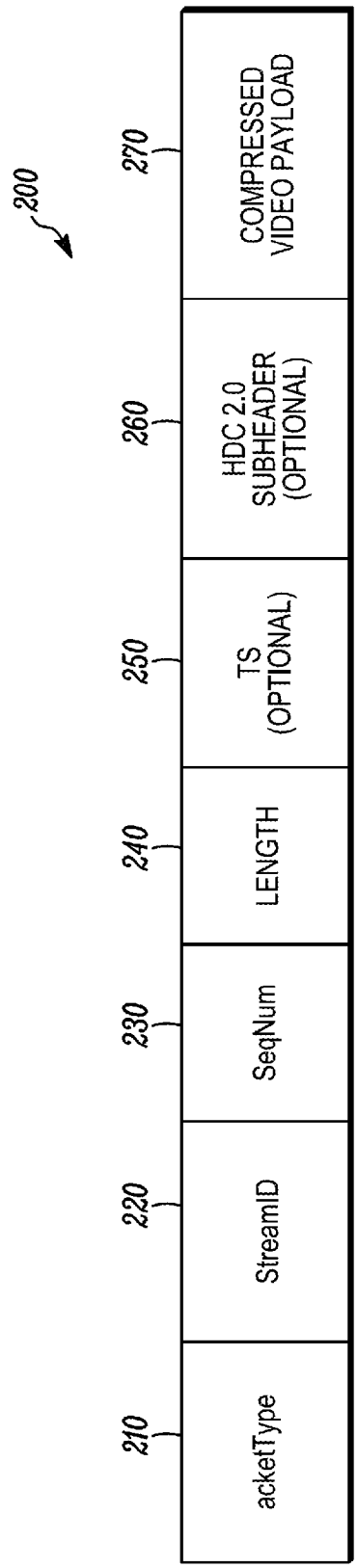
FIG. 2 shows a data packet format for compressed video in WiGig A/V PAL according to embodiments of the present invention.

As shown generally as 200 of FIG. 2 compressed video data may be packetized according to the A/V PAL packet format. It may include PacketType 210, StreemID 220, SeqNum 230, Length 240, TS (optional) 250, HDC 2.0 subheader (optional) 260 and compressed video payload 270.

Due to the size limitations of the MAC service data unit (SDU), a slice may be fragmented into multiple PAL packets or aggregation may occur across slice 110, 120, 130 boundaries. Consequently, the sink has to implement a parsing function in order to reconstruct a video slice before starting to decode the data.

Again, this parsing at the receiver side introduces extra E2E latency which leads to a degraded user experience. In addition, parsing requires extra buffer to store the received packet in order to reconstruct a video slice before the decoding starts.

Figure 3:
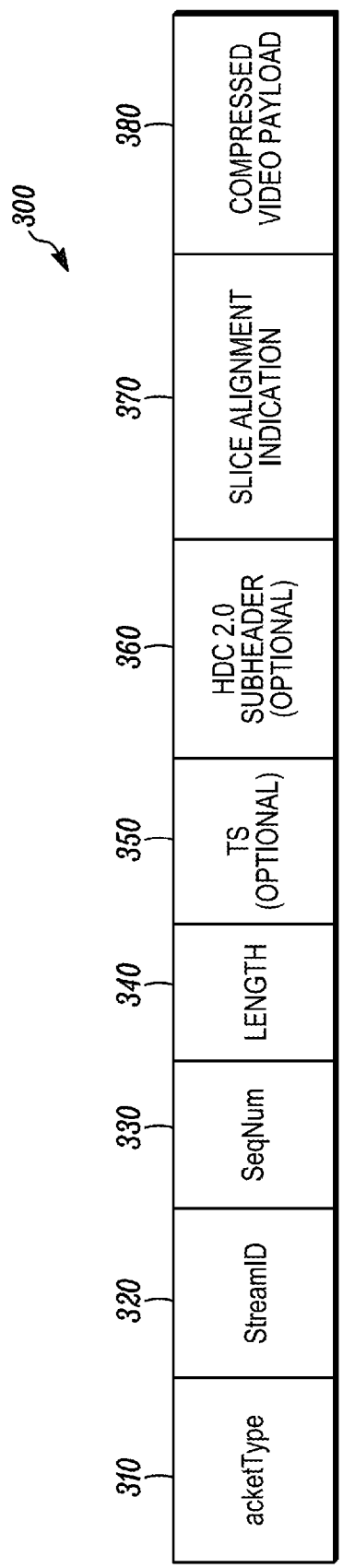
FIG. 3 shows a proposed PAL header with slice alignment indications according to embodiments of the present invention.

Embodiments of the present invention eliminate the need for parsing at the sink side and thus reduce E2E latency as well as buffer requirements by providing an indication in the PAL packet header on whether the slice is aligned inside the payload. This may be referred to herein as a slice alignment indication in the PAL packet header with FIG. 3 showing a proposed packet format with the new field. In an embodiment of the present invention the packet format may include PacketType 310, StreamID 320, SeqNum 330, Length 340, TS (optional) 350, HDC 2.0 subheader (optional) 360, Slice Alignment Indication 370 and compressed video payload 380.

The slice alignment indication field is set to 1 if the compressed video in the payload is aligned at the slice boundary, i.e., no fragmentation is conducted within a slice and no aggregation is taken place across slice boundaries. The field is set to zero otherwise.

Regarding sink operation based on the slice alignment indication, when a sink receives a PAL packet and the slice alignment bit is set to 1, it shall bypass the parsing logic and send the compressed data directly to the decoder for decompression. If the slice alignment indication is set to zero, the sink must pass the payload to parsing logic in order to reconstruct video slices.

It is noted that the same mechanism can also be applied to uncompressed data packet to skip the parsing requirements for reduced low-latency and buffer requirement.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a transceiver adapted for low-latency video transmissions over mmWave communications by defining a new slice alignment indication (SAL) field in an audio/video protocol adaptation layer (A/V PAL) packet header, wherein the PAL packet header comprises a PacketType field, a StreamID field, a SeqNum field, a Length field, the new SAL field, and a compressed video payload and wherein the A/V PAL is a layer above a medium access control (MAC) layer defining audio/video transmissions over mmWave communications;
wherein the new slice alignment indication field indicates whether the compressed video payload is aligned at a slice boundary and thus does not need parsing at a sink;
wherein said new slice alignment indication field is set to 1 when compressed video in said compressed video payload is aligned at said slice boundary.

2. The apparatus of claim 1, wherein when said compressed video in said compressed video payload is aligned at said slice boundary, no fragmentation is conducted within a slice and no aggregation is taken place across slice boundaries.

3. The apparatus of claim 2, wherein when compressed video in said compressed video payload is not aligned at said slice boundary, said new slice alignment indication field is set to zero.

4. The apparatus of claim 1, wherein when said sink receives a PAL packet and said new slice alignment indication field is set to 1, then it shall bypass parsing logic and send compressed data directly to a decoder for decompression and when said slice alignment indication field is set to zero, then said sink must pass said compressed video payload to parsing logic in order to reconstruct video slices.

5. The apparatus of claim 1, wherein video to be transmitted is uncompressed.

6. A method, comprising:
using a transceiver adapted for low-latency video transmissions over mmWave communications that defines a new slice alignment indication (SAL) field in an audio/video protocol adaptation layer (A/V PAL) packet header, wherein the PAL packet header comprises a PacketType field, a StreamID field, a SeqNum field, a Length field, the new SAL field, and a compressed video payload and wherein the A/V PAL is a layer above a medium access control (MAC) layer defining audio/video transmissions over mmWave communications;
wherein the new slice alignment indication field indicates whether the compressed video payload is aligned at a slice boundary and thus does not need parsing at a sink;
wherein said new slice alignment indication field is set to 1 when compressed video in said compressed video payload is aligned at said slice boundary;
wherein when said compressed video in said payload is aligned at said slice boundary, no fragmentation is conducted within a slice and no aggregation is taken place across slice boundaries.

7. The method of claim 6, wherein when compressed video in said compressed video payload is not aligned at said slice boundary said new slice alignment indication field is set to zero.

8. The method of claim 6, wherein when said sink receives a PAL packet and said new slice alignment indication field is set to 1, then it shall bypass parsing logic and send compressed data directly to a decoder for decompression and when said new slice alignment indication field is set to zero, then said sink must pass said compressed video payload to parsing logic in order to reconstruct video slices.

9. The method of claim 6, wherein video to be transmitted is uncompressed.

10. A non-transitory computer readable medium encoded with computer executable instructions, which when accessed, cause a machine to perform operations comprising:
using a transceiver adapted for low-latency video transmissions over mmWave communications that defines a new slice alignment indication field in an audio/video protocol adaptation layer (A/V PAL) packet header, wherein the PAL packet header comprises a PacketTvpe field, a StreamlD field, a SegNum field, a Length field, the new SAL field, and a compressed video payload and wherein the A/V PAL is a layer above a medium access control (MAC) layer defining audio/video transmissions over mmWave communications;
wherein the new slice alignment indication field indicates whether a payload is aligned at a slice boundary and thus does not need parsing at a sink, wherein when compressed video is in the compressed video payload that is aligned at the slice boundary then assigning a value to the slice alignment indication field.

11. The non-transitory computer readable medium encoded with computer executable instructions of claim 10, wherein said new slice alignment indication field is set to 1 when compressed video in said compressed video payload is aligned at said slice boundary.

12. The non-transitory computer readable medium encoded with computer executable instructions of claim 11, wherein when said compressed video in said compressed video payload is aligned at said slice boundary, no fragmentation is conducted within a slice and no aggregation is taken place across slice boundaries.

13. The non-transitory computer readable medium encoded with computer executable instructions of claim 12, wherein when compressed video in said compressed video payload is not aligned at said slice boundary said new slice alignment indication field is set to zero.

14. The non-transitory computer readable medium encoded with computer executable instructions of claim 10, wherein when said sink receives a PAL packet and said new slice alignment indication field is set to 1, then it shall bypass parsing logic and send compressed data directly to a decoder for decompression and when said new slice alignment indication field is set to zero, then said sink must pass said compressed video payload to parsing logic in order to reconstruct video slices.

15. The non-transitory computer readable medium encoded with computer executable instructions of claim 10, wherein video to be transmitted is uncompressed.

16. A mmWave video transmitter capable of low-latency video transmissions, comprising:
- a new slice alignment indication field (SAL in an audio/video protocol adaptation layer (A/V PAL) packet header, wherein the PAL packet header comprises a PacketType field, a StreamID field, a SegNum field, a Length field, the new SAL field, and a compressed video payload and wherein the A/V PAL is a layer above a medium access control (MAC) layer defining audio/video transmissions over mmWave communications;
- wherein the new slice alignment indication field indicates whether a payload is aligned at a slice boundary and thus does not need parsing at a sink;
- wherein said new slice alignment indication field is set to 1 when compressed video in said payload is aligned at said slice boundary;
- wherein when said compressed video in said payload is aligned at said slice boundary, no fragmentation is conducted within a slice and no aggregation is taken place across slice boundaries;
- wherein when compressed video in said payload is not aligned at said slice boundary said slice alignment indication field is set to zero.

17. The mmWave video transmitter capable of low-latency video transmissions of claim 16, wherein when said sink receives a PAL packet and said a new slice alignment indication field is set to 1, then it shall bypass parsing logic and send compressed data directly to a decoder for decompression and when said slice alignment indication is set to zero, then said sink must pass said payload to parsing logic in order to reconstruct video slices.

18. The mm Wave video transmitter capable of low-latency video transmissions of claim 16, wherein video to be transmitted is uncompressed.

19. An apparatus, comprising:
- a transceiver adapted for low-latency video transmissions over mmWave communications by defining a new alignment indication field (SAL) in an audio/video protocol adaptation layer (PAL) packet header to indicate whether a payload is aligned at a slice boundary and thus does not need parsing when received at a wireless display, wherein in addition to the new alignment indication field the PAL packet header comprises a PacketType field, a StreamID field, a SegNum field, a Length field, the new SAL field, and a compressed video payload and wherein the A/V PAL is a layer above a medium access control (MAC) layer defining audio/video transmissions over mmWave communications;
- wherein said new alignment indication field is set to 1 when compressed video in said payload is aligned at said slice boundary and wherein when the compressed video in said payload is not aligned at said slice boundary, said new slice alignment indication field is set to zero;
- wherein when said wireless display receives a PAL packet and said a slice alignment bit is set to 1, then it shall bypass parsing logic and send compressed data directly to a decoder for decompression and when said slice alignment indication is set to zero, then said wireless display must pass said payload to parsing logic in order to reconstruct video slices.

* * * * *